Figure 4:
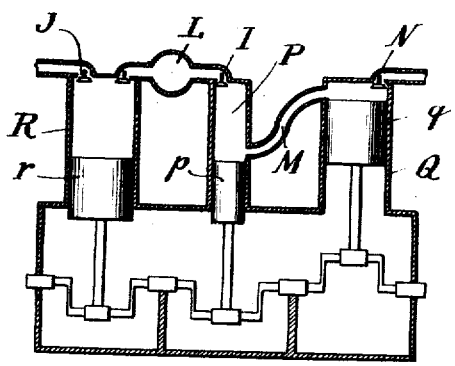

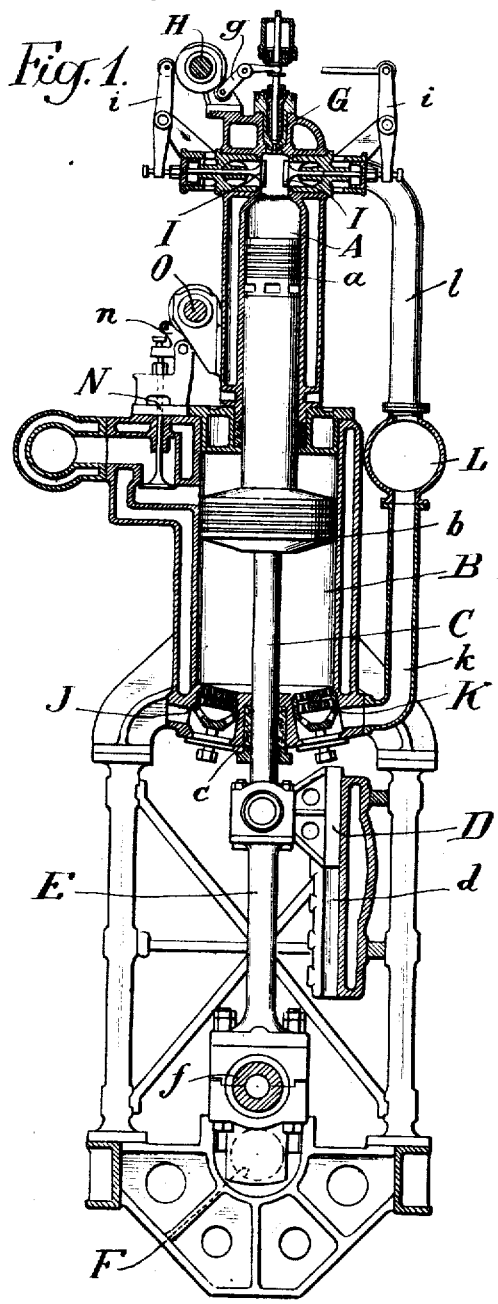
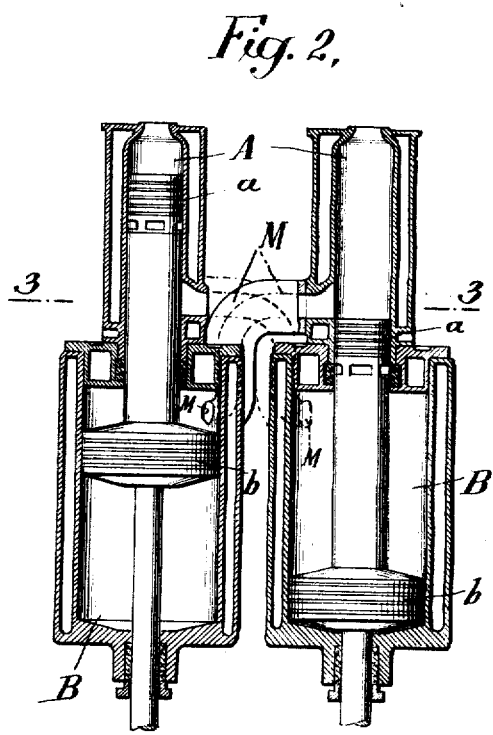
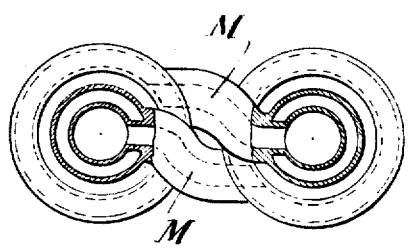

G. C. DAVISON.
TWO-CYCLE MULTIPLE EXPANSION DIESEL ENGINE.
APPLICATION FILED MAY 14, 1913.

1,138,938.

Patented May 11, 1915.
2 SHEETS—SHEET 2.

WITNESSES

INVENTOR
Gregory C. Davison
BY
ATTORNEYS

UNITED STATES PATENT OFFICE.

GREGORY CALDWELL DAVISON, OF NEW LONDON, CONNECTICUT, ASSIGNOR TO ELECTRIC BOAT COMPANY, OF NEW YORK, N. Y., A CORPORATION OF NEW JERSEY.

TWO-CYCLE MULTIPLE-EXPANSION DIESEL ENGINE.

1,138,938.      Specification of Letters Patent.      Patented May 11, 1915.

Application filed May 14, 1913. Serial No. 767,531.

*To all whom it may concern:*

Be it known that I, GREGORY C. DAVISON, a citizen of the United States, residing at and whose post-office address is New London, county of New London, and State of Connecticut, have invented certain new and useful Improvements in Two-Cycle Multiple-Expansion Diesel Engines; and I do hereby declare the following to be a full, clear, and exact description of the invention, such as will enable others skilled in the art to which it appertains to make and use the same.

In an internal combustion engine working on the Diesel cycle in which low grade fuels are injected into a body of air the temperature of which has been raised by high compression to a point which effects the ignition of the fuel, fluid pressures of 500 pounds to the square inch or thereabouts occur within the working cylinders during the early portions of the working stroke; and these high initial pressures require a large cylinder volume for final expansion of the gases to the low pressure at which discharge takes place. The high pressures are, however, present only during the early stages of the expansion of the gases, the greater part of the expansion during the working stroke taking place at much lower pressures.

The cylinders, cylinder heads, pistons, power transmitting parts and frames of such engines must be made to withstand the maximum pressures and stresses, so that the entire engine is necessarily built for a pressure of about 500 pounds to the square inch over an area of piston and cylinder head which is large enough to give the desired cylinder volume, the ratio of bore to stroke being restricted within rather narrow limits by constructural considerations of piston speed, length of crank, etc.; and this is true notwithstanding the fact that the extreme pressure is present for but a minimum part of the stroke of the engine. Furthermore, the above described conditions give rise to very poor distribution of the piston thrust during the working stroke. It results from these considerations, and from the fact that the size of such engines is limited to a cylinder capacity which does not require a cylinder wall of a thickness precluding proper cooling, that engines of this kind have necessarily been large and heavy in proportion to their horse power, and the output per unit has been so limited as seriously to restrict their application in various industrial fields.

It is the object of this invention to provide means whereby in such engines the piston thrust is more uniformly distributed throughout the working stroke, the maximum thrust is greatly reduced, the weight and size of the engine per horse power are substantially diminished, and the attainable output per engine unit is considerably increased.

The invention contemplates the accomplishment of the before-mentioned objects by applying the initial high pressure expansive effort of the gases to a piston of comparatively small area, and thereafter applying the expansive effort of the heated gases which exert a lower pressure to a piston of relatively large area, the areas of the two pistons preferably being proportioned inversely as the mean pressures per square inch exerted upon them by the expanding gases, so that the maximum piston thrusts are substantially the same in the case of both high and low pressure piston and much smaller variation in the thrust of the expanding gases upon the pistons takes place throughout their strokes. By such application of the expansive effort of the gases upon pistons of different areas in separate expansion periods during which the expanding gases exert considerably different pressures per square inch, the piston thrusts throughout the entire period of the expansion of the gases is made more uniform and an average piston thrust is obtainable, which admits of the use of lighter construction in the parts of the engine which are subject to the strains induced by the piston thrust. Not only is the maximum piston thrust greatly lowered by this distribution of the expansive effort of the gases, but the expansive effort is distributed more evenly throughout each of the periods of the divided cycle, which further admits of a lightened construction of the parts designed to resist the piston thrusts. The cylinder in which the piston of smaller diameter will work may have lighter walls which are capable, with this diminished diameter, of withstanding the high pressures employed with the Diesel cycle, and because of this the limitations as to cylinder capacity, arising from the extreme pressures employed and the impossibility of effectively cooling cylinder walls which exceed a certain thickness, are largely obviated. The high pressure cylinder may be of as great diameter as that now employed for the entire expansive effort of the gases, the low pressure cylinder being of correspondingly greater diameter, though of much lighter construction, as it will never be subjected to pressures which approach the maximum pressures required in the present engines.

Owing to the high temperatures of the gases, throughout that period of their expansion within which it is practical to make the proposed division of the cycle, it is impracticable to employ valves of any known description for controlling the movements of the gases from one cylinder to the other, and it has been necessary to devise means whereby the entire body of the expanding gases could be transferred from a piston of less effective area to one of greater effective area. This is accomplished in the new arrangement by the employment of a high pressure cylinder working upon the two-cycle principle, and in which the high pressure piston uncovers an unobstructed port leading through an open conduit to the interior of the low pressure cylinder. In order to operate the high pressure cylinder on the two-cycle principle, and thereby make possible the use of the valveless conduit between the high and low pressure cylinders, it has been necessary to raise the range of pressures within which the high pressure cylinder operates, raising the pressure of the scavenging air which is employed to move the expanding contents of the high pressure cylinder to the low pressure cylinder to a point above the initial pressures which are to be utilized in the low pressure cylinder. In order to adapt the low pressure cylinder for the reception and utilization of the expanding gases exhausted from the high pressure cylinder, it has been found advisable to use a mechanically operated valve to control the exhaust from the low pressure cylinder, the use of such a valve being feasible at this point because of the greatly reduced temperature of the gases at this stage of the cycle.

The new periodic arrangement of the Diesel cycle is, in the strict sense, two-cycle throughout, the expansive effort of the gases being utilized at every revolution of the engine upon each of the pistons employed and the creation of this cycle now gives rise to the type of engine illustrated in the embodiments hereinafter described and shown in the accompanying drawings, which type of engine is most efficient in point of weight and size per horse power, and is capable of being built in sizes of fully twice the horse power per engine unit of that now deemed to be the limit, in view of difficulties arising from the inability to effectually cool the heavy walls of cylinders of great size, and the other limitations above suggested.

Figure 5:
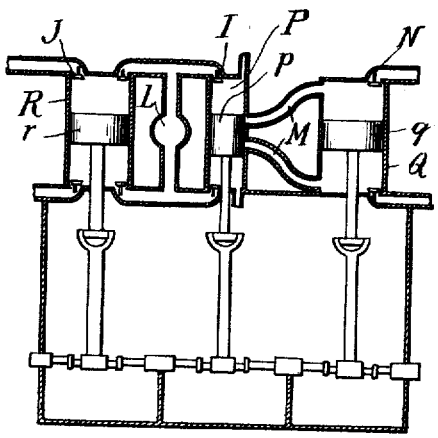
Figure 6:
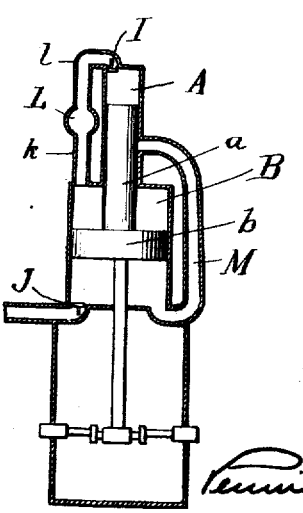

In the drawings, Figure 1 is a vertical transverse section through one unit of a preferred form of engine designed to operate upon the new divided Diesel cycle herein described; Fig. 2 is a vertical longitudinal section through the cylinders of two interconnected units of the same engine, and Fig. 3 is a horizontal section on line 3—3 of the structure shown in Fig. 2; Fig. 4 illustrates diagrammatically the arrangement of the parts of an engine in which simple single acting pistons are employed for the high pressure, low pressure and scavenging pump cylinder. Fig. 5 illustrates diagrammatically an engine of practically the same type as that shown in Fig. 4, but in which the cylinders are double acting; Fig. 6 illustrates diagrammatically an engine in which the lower and larger part of the differential piston is made double acting so that the high pressure or combustion period of the cycle acts upon the upper end of the differential piston, the low pressure period of the cycle acts upon the lower end of the piston which lower end is of greater diameter and the scavenging air is compressed within the annular cylinder by the upper side of that portion of the differential piston which is of greatest diameter.

Referring to Figs. 1, 2 and 3, the engine therein illustrated has a high pressure cylinder A and a low pressure cylinder B of greater diameter, these cylinders being arranged coaxially and communicating endwise to accommodate a differential piston comprising the part $a$ working in the cylinder A and the part $b$ working in the cylinder B. The piston $ab$ is connected with a piston rod C working through a stuffing box $c$ in the lower end of the cylinder B. The lower end of the piston rod C is guided by a cross head D sliding in guides $d$ on the framing of the engine and a pitman E connects the cross head D with a wrist pin $f$ of the crank shaft F in the usual way. It will now be seen that both parts of the piston $ab$ have the same stroke. The high pressure cylinder A is shown provided with a mechanically operated fuel injection valve G actuated through a lever $g$ from a cam shaft H. The cylinder A is also provided with mechanically operated scavenging valves I actuated through levers $i$ from the cam shaft H. The space within the cylinder B beneath the piston $b$ is employed as the air compressor; and an air inlet valve J, through which air is drawn directly from the surrounding atmosphere into the cylinder B, is located in the lower head of the cylinder B. An air discharge valve K is also located in the lower head of the cylinder B and controls the discharge of the air from the cylinder B into a pipe k which leads to a compressed air receiver L. A pipe l leads from the compressed air receiver L to the scavenging valves I in the head of the high pressure cylinder. The space in the cylinder B above the piston b is employed as the low pressure cylinder and unobstructed cross connecting passages M connect the high pressure cylinder of one unit with the low pressure cylinder of another unit, the crank of which is set at or about 180° to that of the first unit. The cross connecting passage M affords open communication between the high pressure cylinder of one unit and the low pressure cylinder of another unit when the piston a in said high pressure cylinder is near or at its lowermost position and the piston b of the corresponding low pressure cylinder is near or at its uppermost position.

The operation of this engine is as follows, referring to the units as shown in Fig. 2 as the first and second reading from left to right: The air in the high pressure cylinder of the first unit having been compressed by the upward movement of the piston a to approximately 500 pounds per square inch, the fuel is injected through the valve G and is ignited by the high temperature of the compressed air, and burns, expanding the air and forcing down the piston a, the combustion of the fuel continuing throughout the greater part of the stroke. When the piston a of this first unit uncovers the passage M in its downward stroke, the hot gases rush through the passage M to the cylinder B of the second unit in which is a suitable clearance volume, expanding their passage so that they exert a pressure of somewhere about 150 pounds per square inch on the upper side of the piston b in the cylinder B of the second unit, which is at this time at or about the upward limit of its stroke, and force the piston b in this second unit downwardly. During the combustion of the fuel in the high pressure cylinder, the high pressure, approximately 500 pounds, is maintained by the combustion throughout the greater part of the stroke. At the same time that the piston a in the first unit is moved downward by the burning of the fuel in the high pressure cylinder air is compressed under the piston b in the cylinder B of this first unit and forced through the air passage valve K and the pipe k to the compressed air receiver L, this air being brought to a pressure somewhat higher than the pressure exerted by the exhaust gases from the high pressure cylinder on the low pressure piston so that when the scavenging valves I open just after the hot gases are allowed to pass to the low pressure cylinder by the uncovering of the passage M, this compressed air will displace all of the hot gases remaining in the high pressure cylinder into the low pressure cylinder and charge the high pressure cylinder with fresh air. It will be seen, owing to the cranks being set at or about 180°, that when the differential piston in the second unit is moving downward that in the first unit will be moved upward and air will be drawn into the cylinder B under the piston b through the air inlet valve J. Both units work alike with about 180° difference in the time of their operations and therefore the gases discharged from the high pressure cylinder of one unit will exert their expansive effort upon the low pressure piston of the other unit simultaneously with the exertion of the expansion effect of the burning fuel in the high pressure cylinder of this last named unit, the downward piston thrust being the sum of the thrusts upon the high and the low pressure parts of the differential piston. But as the thrusts imparted to the high pressure part a and the low pressure part b of the differential piston are in this form of the invention approximately the same, owing to the proportioning of their diameters relatively to the differences in pressures per square inch exerted upon them, the piston thrust exerted upon the piston rod, pitman and crank is much nearer a mean thrust than is the case where the entire expansion of the gases is accomplished in a cylinder of one diameter. The engine described does not require such heavy construction of the cylinder walls as would be necessary if the maximum pressures were utilized in a cylinder of the same diameter in which the lower expansive pressures were made use of.

The expanded gases are discharged from the low pressure cylinders through mechanically operated exhaust valves N which are actuated through levers n from a cam shaft O, being opened throughout the upstrokes of the pistons. It is feasible to employ these mechanically operated exhaust valves N in this position as the temperature of the fully expanded gases which are discharged through them is well within working bounds, whereas such a valve could not be employed successfully between the high and low pressure cylinders under the operation of this new divided cycle as the temperature of the gases at the time of their transfer from the high to the low pressure cylinder is considerably above that at which the operation of valves of any kind is good practice.

In the modified arrangements of the engine illustrated in Figs. 4, 5 and 6, one unit consisting of the high and low pressure cylinders and the air compressor would serve to complete the operation of a cycle. In the modification shown in Fig. 4, a high pressure cylinder P provided with a simple piston p, a low pressure cylinder Q provided with a simple piston q and an air compressor cylinder R provided with a simple piston r are arranged upon a single crank shaft. The air compressor and the high pressure pistons are set at the same angle and the low pressure piston is set at or about 180°. Upon the downstroke of the high pressure piston and the compressor piston, combustion of the fuel takes place in the high pressure cylinder P and the air is drawn into the compressor cylinder R through the air inlet valve J. At the same time the contents of the low pressure cylinder Q are being discharged by the upward movement of the piston q through the mechanically operated exhaust valve N. Upon the completion of this stroke of the engine, the contents of the high pressure cylinder P expand through the passage M into the low pressure cylinder Q over the piston q being entirely displaced from the high pressure cylinder P by the inrush of scavenging air at high pressure from the compressed air receiver L through the scavenging valve I. The piston Q then moves downwardly under the expansive effect of the hot gases, and compression is effected of the fresh air in both the high pressure cylinder P and the compressor cylinder R, the air in the compressor cylinder R being compressed from atmospheric pressure and the air in the high pressure cylinder being raised from the pressure at which it was delivered from the air receiver L. The modification illustrated in Fig. 5 is substantially a duplicate of that shown in Fig. 4 except that the high and low pressure and air compressor cylinders are made double acting.

The modification shown in Fig. 6 illustrates an arrangement similar to the preferred form, differing therefrom, however, in that the space beneath the larger part b of the differential piston is employed as the low pressure cylinder and that above this larger part b of the differential piston is employed as the air compressor. This latter arrangement admits of the complete operation of the new divided cycle in a single engine unit.

What I claim is:—

1. In a multiple expansion oil engine for operation upon the Diesel cycle of converting the heat energy of fuel into work, a high pressure two-cycle internal combustion engine provided with the adjuncts necessary for the initiation of the Diesel cycle, a lower pressure fluid expansion engine coupled with and arranged to receive the partially expanded gases from said internal combustion engine, and a source of high pressure scavenging air for bodily displacing the expanding gases from said internal combustion engine into said fluid expansion engine; substantially as described.

2. In a multiple expansion oil engine for operation upon the Diesel cycle of converting the heat energy of fuel into work, a high pressure two-cycle internal combustion engine having a piston-controlled exhaust port and provided with the necessary adjuncts to work upon the combustion period of the Diesel cycle, a lower pressure fluid expansion engine coupled with said internal combustion engine, arranged to receive the expanding gases therefrom, and work upon the expansive period of the Diesel cycle, and a source of high pressure scavenging air for bodily displacing the expanding gases from said internal combustion engine into said fluid expansion engine through said piston-controlled exhaust port; substantially as described.

3. In a multiple expansion oil engine for operation upon the Diesel cycle of converting the heat energy of fuel into work, a high pressure cylinder and piston working on the two cycle principle and having only sufficient capacity to effectively utilize the substantially constant pressure expansive action of the gases during the combustion period of the Diesel cycle, a cylinder and piston of greater capacity for receiving and utilizing the further expansive action of the gases burnt in said first cylinder, and means for bodily transferring the contents of said first cylinder to said second cylinder after the completion of said combustion period; substantially as described.

4. In a multiple expansion oil engine for operation upon the Diesel cycle of converting the heat energy of fuel into work, a high pressure cylinder and piston working on the two cycle principle and having only sufficient capacity to effectively utilize the substantially constant pressure expansive action of the gases during the combustion period of the Diesel cycle, and a low pressure cylinder and piston whose working stroke is counter to that of said high pressure cylinder, and means for bodily transferring the contents of said high pressure cylinder into said low pressure cylinder at the end of the working stroke of said high pressure piston and at the beginning of the working stroke of said low pressure piston; substantially as described.

5. In a multiple expansion oil engine for operation upon the Diesel cycle of converting the heat energy of fuel into work, a high pressure cylinder and piston having a piston controlled exhaust port and working on the two cycle principle, said high pressure cylinder and piston having only sufficient capacity to effectively utilize the substantially constant pressure expansive action of the gases during the combustion period of the Diesel cycle, a low pressure cylinder and piston the working stroke of which is counter to said high pressure piston, an open conduit leading from the exhaust port of said high pressure cylinder to the compression space of said low pressure cylinder, and a source of high pressure scavenging air for bodily transferring through said conduit the contents of said high pressure cylinder to said low pressure cylinder upon the opening of said exhaust port of said high pressure cylinder by the movement of the high pressure piston; substantially as described.

6. In a multiple expansion oil engine for operation upon the Diesel cycle of converting the heat energy of fuel into work, two contour working engine units each comprising a differential cylinder and piston providing high and low pressure working cylinders and an air pump, the high pressure cylinder of each of said units having a piston controlled exhaust port adapting it to be worked upon the two cycle principle and a capacity only sufficient to utilize the substantially constant pressure combustion period of the Diesel cycle, a cross-connecting open conduit between the exhaust port of each high pressure cylinder and the compression space of the low pressure cylinder of the other unit, and mechanically operated exhaust valves for said low pressure cylinders; substantially as described.

In testimony whereof I affix my signature, in presence of two witnesses.

GREGORY CALDWELL DAVISON.

Witnesses:
F. L. BRAKE,
W. D. FISHER.

Correction in Letters Patent No. 1,138,938.

It is hereby certified that in Letters Patent No. 1,138,938, granted May 11, 1915, upon the application of Gregory Caldwell Davison, of New London, Connecticut, for an improvement in "Two-Cycle Multiple-Expansion Diesel Engines," an error appears in the printed specification requiring correction as follows: Page 5, line 14, for the word "contour" read *counter;* and that the said Letters Patent should be read with this correction therein that the same may conform to the record of the case in the Patent Office.

Signed and sealed this 15th day of June, A. D., 1915.

[SEAL.]
J. T. NEWTON,
*Acting Commissioner of Patents.*